United States Patent [19]

Stockman et al.

[11] 4,263,638
[45] Apr. 21, 1981

[54] DIAL WOUND CAPACITOR AND METHOD OF MAKING SAME

[75] Inventors: Robert M. Stockman, Brookfield Center; Joseph J. Sipovic, Danbury, both of Conn.

[73] Assignee: American Radionic Co., Inc., Danbury, Conn.

[21] Appl. No.: 51,822

[22] Filed: Jun. 25, 1979

[51] Int. Cl.³ ............................................ H01G 4/38
[52] U.S. Cl. .................................. 361/328; 29/25.42; 361/304; 361/308; 361/323; 361/330
[58] Field of Search ............... 361/308, 309, 328, 330, 361/323, 304; 29/25.42

[56] References Cited

U.S. PATENT DOCUMENTS

| 1,633,576 | 6/1927 | Franks . | |
|---|---|---|---|
| 2,735,970 | 2/1956 | Peck | 361/323 |
| 3,434,024 | 3/1969 | Vialina | 361/309 |
| 3,921,041 | 11/1975 | Stockman | 361/330 |
| 4,028,595 | 6/1977 | Stockman | 361/328 |

FOREIGN PATENT DOCUMENTS

| 1122175 | 4/1960 | Fed. Rep. of Germany | 361/323 |
|---|---|---|---|
| 975276 | 10/1961 | Fed. Rep. of Germany | 361/323 |
| 2820232 | 11/1978 | Fed. Rep. of Germany | 361/323 |

*Primary Examiner*—E. A. Goldberg
*Attorney, Agent, or Firm*—Parmelee, Johnson, Bollinger & Bramblett

[57] ABSTRACT

A dual wound capacitor is provided in which two capacitors with a common electrode are provided or two separate capacitors are provided in a single winding operation. First and second metallized dielectric films are wound through a predetermined number of turns to a position preceding a gap in at least one of the metallized sides of the film. The gap is formed by removing or omitting metal from an intermediate portion on the dielectric film either before the capacitor is wound or during the winding process. The gap so formed may be as narrow as an eighth of an inch and, under any circumstance, is substantially less than the length of one winding of the capacitor. An insulated sheet having a length sufficient to encircle the gap is inserted and wound between first and second metallized dielectric films and extends outwardly from one side of the capacitor to form an overlapping circular barrier which separates the metallized portions on each side of the gap. The winding is then completed and the extreme outwardly extending, overlapping edges of the barrier are fused to enclose the gap. Ends of the capacitor are then metal coated and electrical connections are provided to both sides of the barrier and to the other end of the capacitor. The barrier prevents the bridging of the gap when the capacitor is coated. As an alternative, using a wider barrier and spraying at an angle can also be used to prevent the shorting of the gap.

To make two separate capacitors in a single winding, gaps are provided in both metallized films and the insulating sheet encircles both gaps and extends outwardly on both ends of the capacitor which are then coated and electrical connections are made to both sides of the barrier on each end of the capacitor.

7 Claims, 8 Drawing Figures

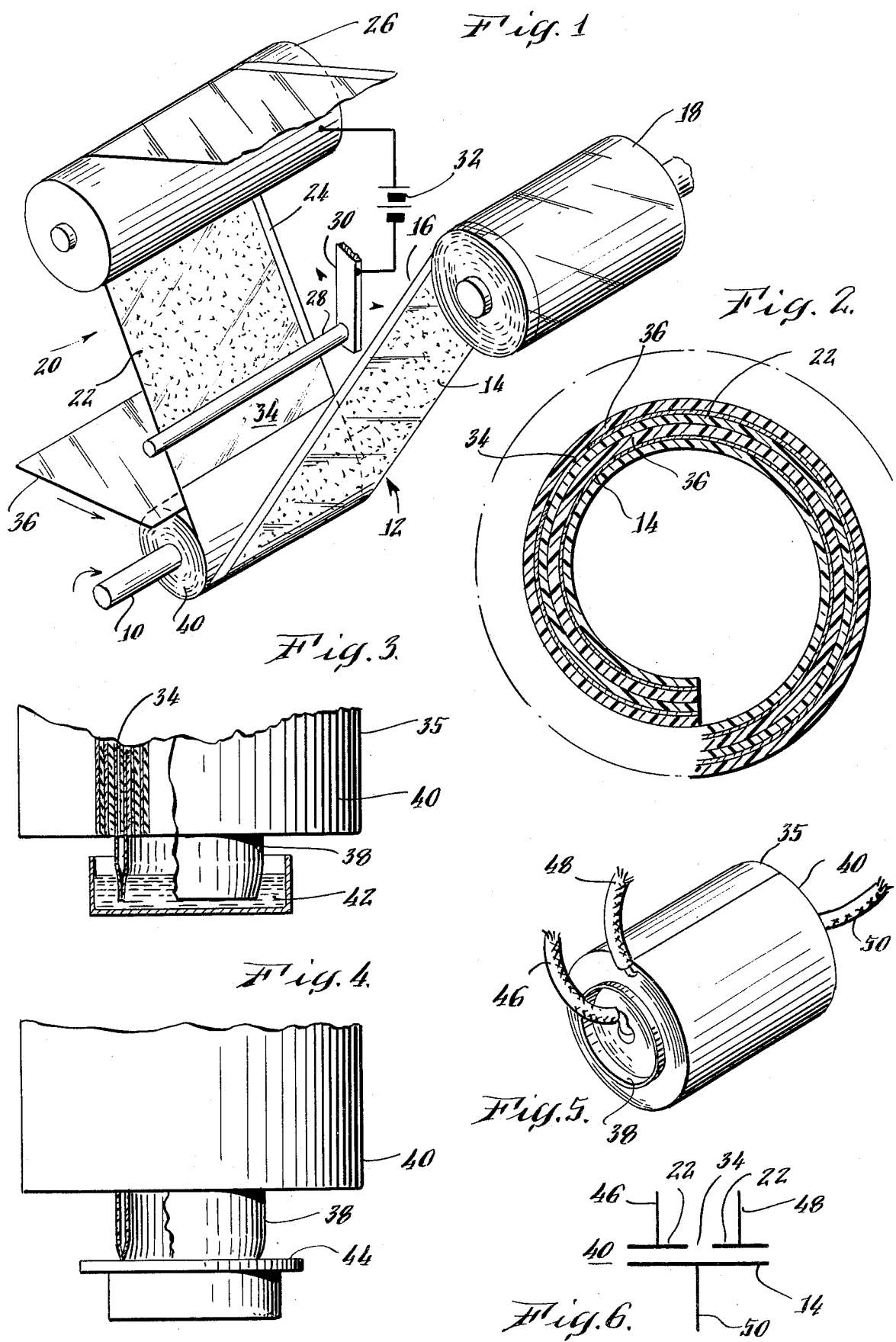

DIAL WOUND CAPACITOR AND METHOD OF MAKING SAME

BACKGROUND OF THE INVENTION

This invention relates to wound capacitors of the metallized film type, and more particularly to such capacitors in which two separate capacitors or two capacitors with a common place are conveniently fabricated in a single winding.

In U.S. Pat. No. 3,921,041 entitled "Dual Capacitor" which is assigned to the assignee of the present invention, a dual metallized capacitor and the method of making the same is provided. In accordance therewith, first and second dielectric film strips being metallized on one side thereof, are wound in substantially cylindrical form with the non-metallized sides of each strip in contact with the metallized side of the other strip. After winding a predetermined number of revolutions depending upon the capacitance desired, the winding is interrupted and an electrode is advanced against one of the metal layers of the film, a voltage is applied thereto and the winding process is continued which removes the metallic layer leaving a non-metallized intermediate region or gap in one of the metallized layers, the length of which is sufficient to encircle the capacitor section at least once. After formation of the gap, the electrode is removed and a sheet of insulating material, such as plastic, is inserted therein and would with the sheet protruding from one end thereof to form a circular barrier which extends outward from the end of the capacitor so formed. The purpose of the insulated barrier is to separate the two plates on each side of the gap and to permit the making of electrical connections therein without shorting the gap. Accordingly, the two plates of the capacitor to which electrical connections are made are first coated on the ends of the capacitors so formed with a metallized layer to which electrical connections are made both within and outside the barrier. Since the length of the gap encircles the capacitor section at least once, the insulating layer must encircle the gap and requires more than two revolutions to do so. Although the capacitors fabricated using this technique are quite satisfactory, the length of the gap required, along with the amount of insulating material required to be inserted to encircle the gap, tends to slow the winding process as well as requiring use of extra material both with respect to the metallized dielectric film as well as the amount of insulating sheet required to encircle the gap.

SUMMARY OF THE INVENTION

It is an object of the present invention to provide a new and improved dual wound capacitor and method of making the same which uses less material and which may be wound more efficiently in less time.

A further object of this invention is to provide a new and improved method of making a dual metallized film capacitor which facilitates winding two separate capacitors or two capacitors with a common plate in a single winding operation.

In carrying out this invention in one illustrative embodiment thereof, first and second dielectric film strips metallized on one side thereof are wound in substantially cylindrical form with the non-metallized sides of each strip in contact with the metallized side of the other strip. The metallized edge of the first strip is exposed at one end of the cylindrical form and the metallized edge of the second strip is exposed at the opposite end of the cylindrical form which provides a means for making electrical contact with the plates of the capacitor so formed. After a predetermined number of revolutions, depending upon the capacitance desired, a gap is provided on at least one of the metallized sides of one of the dielectric strips. The gap may be provided on a predetermined intermediate section of one of the strips before winding or the metallized layer may be removed after a predetermined number of revolutions have been wound. A sheet of insulating material is inserted between the first and second strips with the insulating layer overlying and encircling the gap and extending outwardly from one end thereof to form an overlapping, circular barrier separating the metallized portions of each side of the gap. The gap so formed is substantially less than one winding of the capacitor and may be as narrow as one-eighth of an inch depending upon the voltage rating of the capacitor so formed and the cleanliness of the removal of the metallization. After insertion of the insulating layer, the winding is completed and the extreme outwardly extending overlying edges of the circular barrier formed by the insulating layer are fused. Metal coatings are applied to each end of the capacitors so formed and electrical connections are made to both sides of the barrier and to the other end of the capacitor thereby providing two capacitors with a common electrode.

By providing gaps in both the first and second metallized strips which are each encircled by the insulating layer which extends outwardly along both ends of the capacitor so formed, fusing both barriers and metal coating each end and making electrical connections to both sides of the barriers formed on each end, two separate capacitors are thus provided in a single winding.

Instead of fusing the ends of the barrier, a wider insulating layer may be utilized to form the barrier with the metal coating being applied by spraying ends of the capacitor at an angle. This will also prevent the bridging or shorting of the gap.

The shorter gap which may be preformed in the supply strips or formed during the winding process utilizes less material and speeds up the winding process. Furthermore, with a preformed gap in the supply roll, the quality of the gap as well as its size may more closely be regulated.

BRIEF DESCRIPTION OF THE DRAWINGS

The invention, together with further aspects, objects, and advantages thereof will be better understood from the following description taken in connection with the accompanying drawings:

FIG. 1 is a perspective view illustrating the winding of a capacitor in accordance with the present invention;

FIG. 2 is an enlarged cross-sectional end view of a portion of the capacitor being wound in FIG. 1, illustrating separation of the plates of the capacitor and the formation of a barrier therearound;

FIG. 3 illustrates a partial side elevational view, partly in section, of the capacitor formed in accordance with the present invention illustrating fusion of the ends of the barrier by immersing the barrier in a solvent;

FIG. 4 is a partial side elevational view similar to FIG. 3 illustrating fusing of the ends of the barrier by the use of a hot plate;

FIG. 5 is a perspective view of a completed capacitor in accordance with the present invention;

FIG. 6 is an electrical schematic diagram of the capacitor of FIG. 5;

DESCRIPTION OF THE PREFERRED EMBODIMENT

Figure 7:
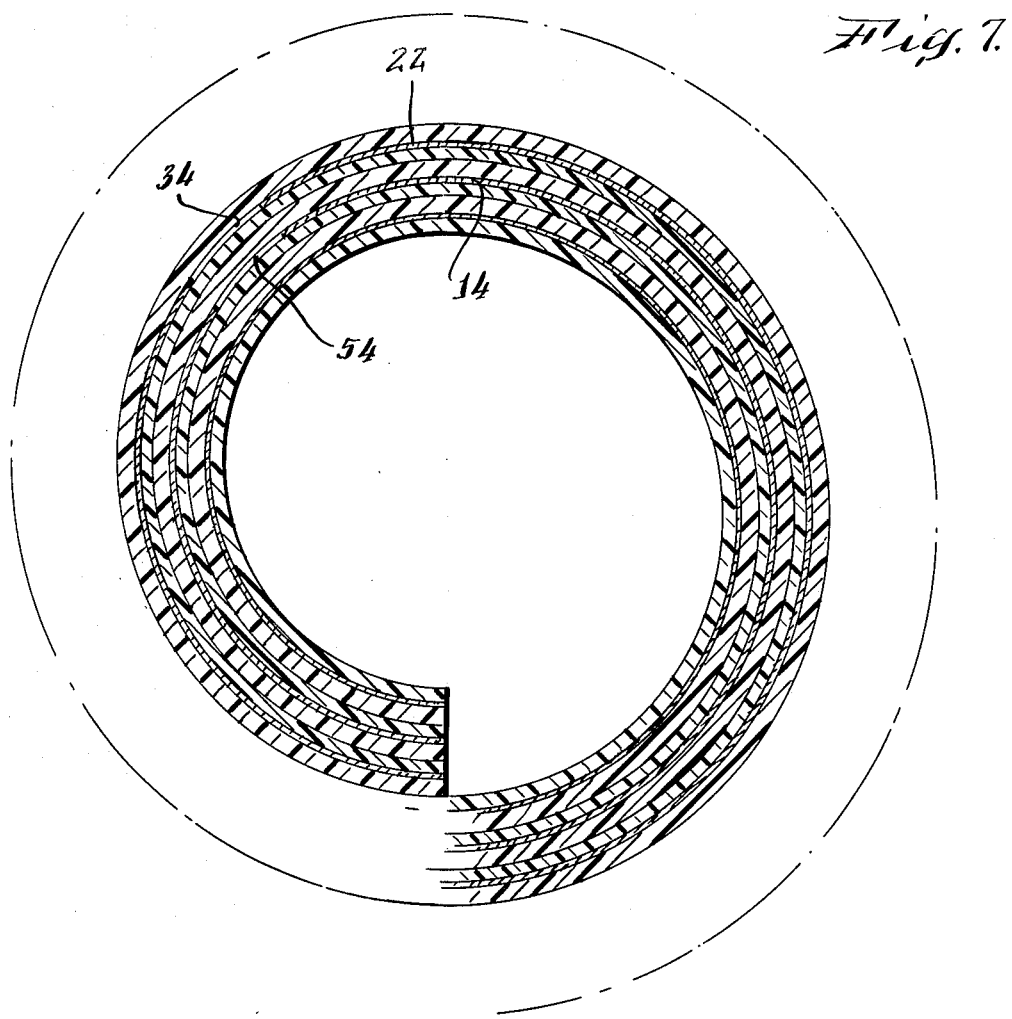
FIG. 7 is an enlarged, partial cross-sectional end view illustrating the application of the present invention in providing two separate capacitors in a single winding.

Referring now to FIG. 1, a capacitor 40 is shown being wound on a rotating spindle 10 of a conventional winding machine. A metallized dielectric film 12 having a metallized surface or thin metallic layer 14 on one side thereof which extends to the right edge of the film but terminates short of the left edge thereof leaving a non-metallized strip 16 thereon, is fed from a first supply roll 18 to the spindle 10.

A second metallized dielectric film 20 carries a thin metal layer 22 thereon which extends from the left edge of the film and terminates short of the right edge to form a non-metallic strip 24 therealong. Metallized dielectric film 20 is fed from a second supply roll (not shown) over a cylindrical copper electrode 26. A second electrode 28 is mounted on a movable arm 30 in order to be selectively advanced against and withdrawn from the metallized layer 22 on the film 20. An electrical power source 32 electrically interconnects electrodes 26 and 28. The electrodes, when actuated by moving the movable electrode 28 into contact with the metallized layer 22, function to provide a voltage to the metal layer 22 for removing metal from the film 20 to provide a separation or gap in the thin metallic layer 22 which ultimately provides separate electrodes for the capacitor 40 being fabricated. The voltage is not critical but must be sufficient when applied to remove metallized layer 22, e.g., 40 V.D.C.

In order to wind the dual capacitor 40 as shown schematically in FIG. 6 which in effect comprises a pair of capcitors sharing a common plate, the films 12 and 20 are simultaneously wound on the spindle 10 in a conventional manner for a predetermined number of revolutions. The number of revolutions will depend upon the capacitance desired. For example, if the capacitance of the dual capacitors are to be equal, one-half of the total length of film will be wound initially.

After this initial winding, a gap 34 is reached in the thin metal layer 22 of the film 20. The gap 34 effectively separates the thin metallized layer 22 in effect to form two electrodes as illustrated schematically in FIG. 6. The gap 34 may be formed in the thin metal layer 22 by advancing the electrode 28 against the metal layer 22 and applying the voltage between the electrodes 26 and 28. Once the gap 34 is formed in the metallized layer 22, the electrode 28 is retracted from the film 20. The gap may also be formed by any alternating metal removing method such as laser burn off or chemical etching.

Alternatively, the gap 34 may be preformed in the film 20 as supplied directly from its supply roll. This has the advantage of accurately forming and controlling the gap when the film 20 is made. Furthermore, in so doing it is not necessary to interrupt the winding process to form the gap 34 utilizing the electrodes 28 and 26.

In accordance with an important aspect of the present invention, regardless of the way the gap is formed, it may be very narrow and can approach a width of one-eighth of an inch. Of course, the size of the gap will depend upon the voltage rating of the capacitor and the cleanliness of the removal of the metallization. The preformed gap is preferred with respect to the latter consideration.

Prior to the occurrence of the gap 34 in the film 22, a sheet of insulating material 36, such as plastic film, mica, textured kraft paper, etc., is inserted and wound between the films 12 and 20. The sheet of insulating material 36 is wound to overlie and encircle the gap 34 and to extend outwardly from at least one end of the capacitor to form an overlapping circular barrier 38 which separates the metallized portions 22 on each side of the gap 34. Winding is then continued and completed in the usual manner with the films 12 and 20 being cut and the completed capacitor 40 being wrapped with a suitable tape 35.

Following winding, the next step is to fuse the extreme outwardly extending overlapping edges of the circular barrier 38 which surrounds the gap 34. The purpose of fusing the gap is to prevent the shorting or bridging of the gap when the ends of the capacitor 40 are metallized in order to attach electrical connections thereto. If the insulated sheet 36 forming the barrier 38 is of a material which may be softened by dipping the barrier into a softening agent, when the barrier 38 may be fused by dipping the barrier in a softening agent in which adjacent portions of the barrier 38 stick together. As illustrated in FIG. 3, if the barrier is made of a material such as polycarbonate, it can be fused by dipping the insert barrier 36 into a softening agent 42 such as methylchloride which fuses the outer extremities of the barrier. Alternatively, as illustrated in FIG. 4, if the insert barrier 38 is made of polyester or other similar material, it can be fused by bringing the barrier 38 into contact with, or rubbing it on, a heated surface or hot plate 44. Ends of the barrier 38 are heated just sufficiently to soften the ends of the barrier 38 so that they stick together or fuse.

After fusing, the ends of the capacitor 40 are metallized by spraying in a conventional manner. The fused ends prevent the sprayed metal from entering and shorting or bridging the gap so formed. Alternatively, a wider insert barrier 36 and spraying or metallizing the ends of the capacitor at an angle will also prevent the shorting or bridging of the gap 34.

The ends of the barrier 38 are then trimmed and leads 46 and 48 are attached inside and outside the barrier 38, and lead 50 is attached to the other end of the capacitor thereby producing the capacitor 40 shown in FIG. 5 and illustrated schematically in FIG. 6.

Figure 8:
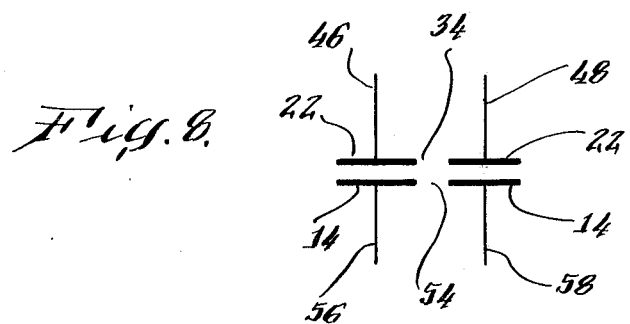
FIG. 8 is an electrical schematic diagram of the capacitor formed in FIG. 7.

By placing a second gap 54 in the metallized surface 14 of the film 12, two separate capacitors as illustrated schematically in FIG. 8, may be formed using the same technique. In the configuration illustrated in FIG. 7, plastic sheet 36 is inserted and wound to completely encircle both gaps 34 and 54 and to extend outwardly on each side of the capacitor 40 to form barriers 38 extending from each side thereof. Both extending barriers are fused, the ends of the capacitor metal coated, and electrical connections made as before, 46 and 48 to one side and 56 and 58 to the other side, which connections are made on both sides of the barriers on both ends of the capacitor 40.

As with respect to the previous embodiment, the gaps may be preformed and supplied to the winding process directly from the supply rolls or may be formed in the metallized layer as the winding process is performed. To form the gaps while winding takes place in the apparatus shown in FIG. 1, additional electrodes would be required for the metallized film 12 for removal of the portions of the thin metal layer 14 therefrom.

In accordance with the present invention, the ability to wind dual capacitors with either a common or separate plates is considerably enhanced by providing a narrow gap between sections which provides a simple but effective method of forming dual capacitors in a compact space while saving material and time in the winding process. Fusing of the ends of the barrier formed within the capacitor or spraying at an angle with respect to the capacitor and making electrical connections thereto minimizes the chances of shorting the separately formed plates of the capacitor.

Since other modifications and changes to fit particular operating requirements and environments will be apparent to those skilled in the art, the invention is not considered limited to the examples chosen for purposes of illustration but covers all changes and modifications which do not constitute departures from the true spirit and scope of this invention as set forth in the appended claims.

What is claimed is:

1. The method of making a cylindrical dual metallized capacitor from first and second dielectric film strips metallized on one side thereof and having a metallized edge exposed on said first strip and a metallized edge exposed on said second strip opposite the metallized edge on said first strip, comprising the steps of
    (a) initially winding said first and second strips in substantially cylindrical form with the non-metallized sides of each strip in contact with the metallized side of the other strip to a position preceding a gap in at least one of said metallized sides formed by the removal of metal from an intermediate position of said strip, said gap having a length as measured along the length of the dielectric films being substantially less than the length of a winding of said capacitor,
    (b) inserting and winding a layer of insulating material between said first and second strips, said insulating layer overlying and encircling said gap and extending outwardly from one side of said capacitor to form an overlapping circular barrier separating the metallized portions on each side of said gap,
    (c) completing the winding for a predetermined length of said first and second strips,
    (d) fusing the extreme outwardly extending overlapping edges of said circular barrier thereby enclosing said gap,
    (e) metal coating each end of said capacitor so formed, and
    (f) making electrical connections on both sides of said barrier and to the other end of said capacitor.

2. The method set forth in claim 1 including the steps of providing a gap in both of said metallized sides, winding said insulating layer to encircle and extend outwardly from both ends of said capacitor to form overlapping circular barriers seperating the metallized portion on each side of each gap which extends from opposite ends of said capacitor, fusing the extreme outwardly extending overlapping edge of said circular barriers, and making electrical connections on both sides of said barriers on each side of said capacitor thereby forming two separate capacitors.

3. The method set forth in claims 1 or 2 including the step of forming said gap before said strips are wound on said capacitor.

4. The method set forth in claims 1 or 2 including the step of forming said gap during winding by contacting said metallized layer with an energized electrode and moving said strip in which the gap is formed relative thereto.

5. The method set forth in claims 1 or 2 in which the circular barrier is fused by bringing the barrier into contact with a heated surface.

6. The method set forth in claims 1 and 2 in which the circular barrier is fused by immersing the barrier in a softening agent.

7. In a cylindrically wound dual capacitor having predetermined capacitor sections wound from first and second lengths of metallized dielectric film to form first and second metal layers separated by a dielectric layer, the improvement comprising:
    (a) each of said metal layers having a gap on a predetermined intermediate portion thereof, each of said gaps having a length which is substantially less than the length of a full winding of said capacitor,
    (b) a dielectric sheet completely encircling said gaps and overlapping on each side of said gap and being fused at each over-lapping sides,
    (c) said dielectric sheet separating said first and second metal layers on opposite sides of said gap and extending outwardly from said capacitor on each end thereof to form a circular barrier separating said metal layers on each side of said gaps,
    (d) means for separately making electrical contact with said metallic layers within and outside said barrier
on each end of said capacitor whereby two completely separate capacitors are provided in the same cylindrical form.

* * * * *

UNITED STATES PATENT AND TRADEMARK OFFICE
CERTIFICATE OF CORRECTION

PATENT NO. : 4,263,638
DATED : April 21, 1981
INVENTOR(S) : Robert M. Stockman and Joseph J. Sipovic It is certified that error appears in the above—identified patent and that said Letters Patent is hereby corrected as shown below:

Title Page [54] "Dial" should be --Dual--. Col. 1, Title of Patent should read --DUAL WOUND CAPACITOR AND METHOD OF MAKING SAME; Col. 1, line 9, "place" should be --plate--; Col. 1, line 29, "would" should be --wound--. Col. 3, line 40, "capcitors" should be --capacitors--. Col. 4, line 24, "when" should be --then--. Col. 6, line 7, "seperating" should be --separating--.

Signed and Sealed this

Thirtieth Day of June 1981

[SEAL]

Attest:

RENE D. TEGTMEYER

*Attesting Officer*  *Acting Commissioner of Patents and Trademarks*